(12) United States Patent
Hacigumus et al.

(10) Patent No.: US 7,478,081 B2
(45) Date of Patent: Jan. 13, 2009

(54) SELECTION OF A SET OF OPTIMAL N-GRAMS FOR INDEXING STRING DATA IN A DBMS SYSTEM UNDER SPACE CONSTRAINTS INTRODUCED BY THE SYSTEM

(75) Inventors: Vahit Hakan Hacigumus, San Jose, CA (US); Balakrishna Raghavendra Iyer, San Jose, CA (US); Sharad Mehrotra, Irvine, CA (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 10/981,895

(22) Filed: Nov. 5, 2004

(65) Prior Publication Data

US 2006/0101000 A1 May 11, 2006

(51) Int. Cl.
*G06F 7/00* (2006.01)
*G06F 17/30* (2006.01)
(52) U.S. Cl. ............... 707/2; 707/3; 707/4; 707/5; 707/6; 707/7; 707/100; 707/101; 707/102
(58) Field of Classification Search ............ 707/2–7, 707/100–102
See application file for complete search history.

(56) References Cited

U.S. PATENT DOCUMENTS

| | | | | | |
|---|---|---|---|---|---|
| 5,418,951 | A | * | 5/1995 | Damashek | 707/5 |
| 5,706,365 | A | * | 1/1998 | Rangarajan et al. | 707/102 |
| 5,752,051 | A | * | 5/1998 | Cohen | 704/1 |
| 5,991,714 | A | * | 11/1999 | Shaner | 704/9 |
| 6,654,734 | B1 | | 11/2003 | Mani et al. | 707/2 |
| 6,775,666 | B1 | | 8/2004 | Stumpf et al. | 707/5 |
| 7,010,522 | B1 | * | 3/2006 | Jagadish et al. | 707/3 |
| 7,149,735 | B2 | * | 12/2006 | Chaudhuri et al. | 707/6 |
| 2002/0099536 | A1 | * | 7/2002 | Bordner et al. | 704/10 |
| 2002/0165873 | A1 | * | 11/2002 | Kwok e tal. | 707/500 |
| 2005/0210383 | A1 | * | 9/2005 | Cucerzan et al. | 715/533 |

OTHER PUBLICATIONS

"Useful English Language Statistics," http://dblp.uni-trier.de/, 3 pages.
"Computer Science Bibliography", http://www-math.cudenver.edu/~wcherowi/courses/m5410/engstat.html, 3 pages.

(Continued)

*Primary Examiner*—Usmaan Saeed
(74) *Attorney, Agent, or Firm*—Sawyer Law Group LLP (57) ABSTRACT

The present invention provides a computer-readable medium and system for selecting a set of n-grams for indexing string data in a DBMS system. Aspects of the invention include providing a set of candidate n-grams, each n-gram comprising a sequence of characters; identifying sample queries having character strings containing the candidate n-grams; and based on the set of candidate n-grams, the sample queries, database records, and an n-gram space constraint, automatically selecting, given the space constraint, a minimal set of an n-grams from the set of candidate n-grams that minimizes the number of false hits for the set of sample queries had the sample queries been executed against the database records.

11 Claims, 9 Drawing Sheets

OTHER PUBLICATIONS

Chen, Zhiyuan et al., "Query Optimization in Compressed Database Systems," ACM SIGMOD May 21-24, 2001, Santa Barbara, California, pp. 271-280.

Cho, Junghoo et al., "A Fast Regular Expression Indexing Engine," pp. 1-12.

Gravano, Luis et al., "Approximate String Joins in a Database (Almost) for Free," Proceedings of the 27th VLDB Conference, Roma, Italy, 2001, 10 pages.

Gravano, Luis et al., "Using q-grams in a DBMS for Approximate String Processing," Bulletin of the IEEE Computer Society Technical Committee on Data Engineering, 2001, pp. 1-7.

Hochbaum, Dorit S., "Analysis of the Greedy Approach in Problems of Maximum," Department of Industrial Engineering and Operations Research, University of California, Berkeley, Mar. 17, 1997, pp. 1-13.

Navarro, Gonzalo, "A Guided Tour to Approximate String Matching," ACM Computing Surveys, vol. 33, No. 1, Mar. 2001, pp. 31-88.

* cited by examiner

Precomputation: Construct a matrix $QG = (f_{ij})$: $1 \leq i \leq |Q|, 1 \leq j \leq |G|$
such that $f_{ij} = 1$ if query $q_i \in Q$ includes gram $g_j \in G$, $f_{ij} = 0$ otherwise Computation:
1   $SG \leftarrow \emptyset$
2   for $i = 1 \ldots k$ do
3     $CG \leftarrow G - SG$
4     for all $g \in CG$ let $benefit(g) = 0$
5      for all $r \in R$ do
6        for all $g \in CG$ do
7          if $g$ is not included in $r$ do
8            for all $q \in Q$ do
9              if $f = 1$, $f$ element of $QG$ coressponding to $q$ and $g$
10               and no previous connection between $r$ and $g$ then
11                $benefit(g) \leftarrow benefit(g) + 1$
12     endfor, endfor, endfor
13     select $g' \in CG$ with maximum $benefit$
14     $SG = SG \cup \{g'\}$
15 endfor
16 return $SG$

SELECTION OF A SET OF OPTIMAL N-GRAMS FOR INDEXING STRING DATA IN A DBMS SYSTEM UNDER SPACE CONSTRAINTS INTRODUCED BY THE SYSTEM

FIELD OF THE INVENTION

The present invention relates to executing text pattern matching queries in database systems, and more particularly to an optimal method for selecting n-grams in a DBMS system under given set of space constraints introduced by the system.

BACKGROUND OF THE INVENTION

With the unprecedented increase in the Internet usage and many new emerging applications, the relative volume of semi-structured and unstructured data managed by database management systems is steadily growing. E-mail, the largest growing data type, HTML and XML data, directory data, product catalogs, customer information data, and free text fields are only a few examples of character data that is being produced, stored and managed every day. The management of text data is a problem of increasing importance.

Users that query character or string data often query it with partial strings for several reasons: 1) power users try to reduce their typing effort, 2) normal users may not know the full content of a text field, for example the NAME field may contain last name or both first and last name, 3) because formats to store data change over time and new data is recorded in a different format compared to the old, for example, a data entry operator may have entered a phone number in the ### ### #### format before retirement, while the new data entry operator enters phone numbers in the 1-###-###-#### format. In addition, first names may not consistently precede last names in name fields. And 4) typographical errors may have been made while entering string data.

Both SQL query language for relational data and XPath query language for XML data allow users to pose complex pattern-based regular expression queries. The requirement is the efficient indexing mechanisms to evaluate such queries. Although the problem of approximate string matching has been studied, as it is surveyed in the literature, these results have not been utilized much in relational database management systems (DBMS). A common approach adopted by commercial database systems is moving the functionality into object-relation extenders to support approximate string matching. However, by moving the function into an extender, efficiency of query execution is compromised. This comes from the inability of query optimizers to handle object-relational extensions well during query optimization. As a result, grossly inefficient query execution plans may be selected.

SQL, perhaps the most widely used database query language, supports a LIKE clause against character fields. Through the LIKE clause, UNIX style, wildcard queries may be specified. Two special characters' and '%' may be used to specify any single character match, and match against any substring, respectively.

Figure 1:
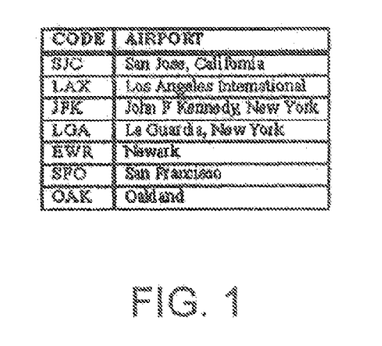
FIG. 1 is a diagram illustrating an example relational database table.

To illustrate, consider a relational database table, shown in FIG. 1, consisting of two fields and seven rows. The SQL query SELECT Code, Airport WHERE Airport LIKE '%Calif%' run against the table would return the row:

<SJC San Jose, Calif.>

And the SQL query SELECT Code, Airport WHERE Airport LIKE 'an %' would return two rows:

<SJC San Jose, Calif.>
<SFO San Francisco>

One technique for implementing partial string queries, such as the SQL LIKE statement, is the use of n-gram based indexing. N-gram based indexing suggests itself, particularly because it can be applied to text in non-English languages (about 50% of database usage is outside the US). It has been previously observed that it is not necessary for an n-gram index to completely and correctly filter the text based on the query. So far as the filtering ensures that no correct results are lost, and a large fraction of the non-qualifying rows are filtered out, the actual wildcard pattern may be checked against the non-filtered data returned.

For example, consider the SQL query SELECT Code, Airport WHERE Airport LIKE '%York %' would return:

<JFK John F Kennedy, New York>
<LGA La Guardia, New York>

By realizing that the n-gram "or" is a substring of the query string, "York", and if the gram "or" indexed the attribute Airport, then the index could be used for partial query evaluation, returning the following three rows:

<SJC San Jose, Calif.>
<JFK John F Kennedy, New York>
<LGA La Guardia, New York>

Subsequent to identification, the wildcard may be evaluated on three rows to filter the one row which was a false hit. At the price of the index access, access of three rows and three evaluations of the regular expression, access and evaluation of the regular expression on the rest of the data may be avoided. It is easy to visualize examples where significant savings may be achieved.

The problem of supporting wildcard queries through n-gram indexing has been previously examined. However, these previous attempts at the problem were approached from the point of view of indexing a huge document collection (like the world wide web). The size of the index created was only limited by the disk space available at the server. In the database context, by contrast, there is contention for disk space by permanent and auxiliary data (temporary sort files, indexes, scratch pads, space for maintenance operations) so one has to be thrifty about space usage for any persistent data structures like indexes. The problem reduces to identifying a valuable set of n-grams to be used for indexing.

Accordingly, what is needed is a method and system for selecting a set of optimal n-grams for indexing string data in a DBMS system under space constraints introduced by the system. The present invention addresses such a need.

BRIEF SUMMARY OF THE INVENTION

The present invention provides a method and system for selecting a set of n-grams for indexing string data in a DBMS system. Aspects of the invention include providing a set of candidate n-grams, each n-gram comprising a sequence of characters; identifying sample queries having character strings containing the candidate n-grams; and based on the set of candidate n-grams, the sample queries, database records, and an n-gram space constraint, automatically selecting, given the space constraint, a minimal set of n-grams from the set of candidate n-grams that minimizes the number of false hits for the set of sample queries had the sample queries been executed against the database records.

According to the method and system disclosed herein, the present invention poses the n-gram selection problem as an optimization problem and formulates the n-gram selection problem as a graph model. The present invention is implemented as an approximation algorithm executed in a DBMS system that provides a near optimal solution for solving the n-gram selection problem, which has proven to be NP-hard. In addition, the approximation algorithm has a provable ratio bound of the optimal solution.

DETAILED DESCRIPTION OF THE INVENTION

The present invention relates to executing text pattern matching queries. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

This invention provides a method and system for executing text pattern matching queries that exploits n-grams for efficient and space-conscious handling of the text pattern matching SQL and/or XML queries. In a preferred embodiment, short strings (n-grams) are generated and used to index string data in a relational database management system (RDBMS). When a string query is posed, the string pattern in the query is matched with the generated n-grams. Matching n-grams are then identified, and indices corresponding to the matched n-grams are traversed to retrieve data strings in the DBMS that contain those n-grams. The retrieved data strings are a (super)set of strings that contain the query pattern which are post-processed to determine the actual answer.

The most important and challenging aspect of the n-gram indexing mechanism in the RDBMS is the approach used to select the n-grams. In general, commercial database products have not modeled or solved this problem analytically, something that would yield better cost models for optimization and enable better access paths for query evaluation.

According to the present invention, a method and system for best n-gram selection based on a graph theoretic characterization of the n-gram selection problem is provided. Using a reduction from a set-cover problem, it is established that the problem of selecting optimal n-grams is NP-hard. Known approximate solutions are then exploited to set cover that provides error bounds to develop an n-gram selection strategy.

Figure 2:
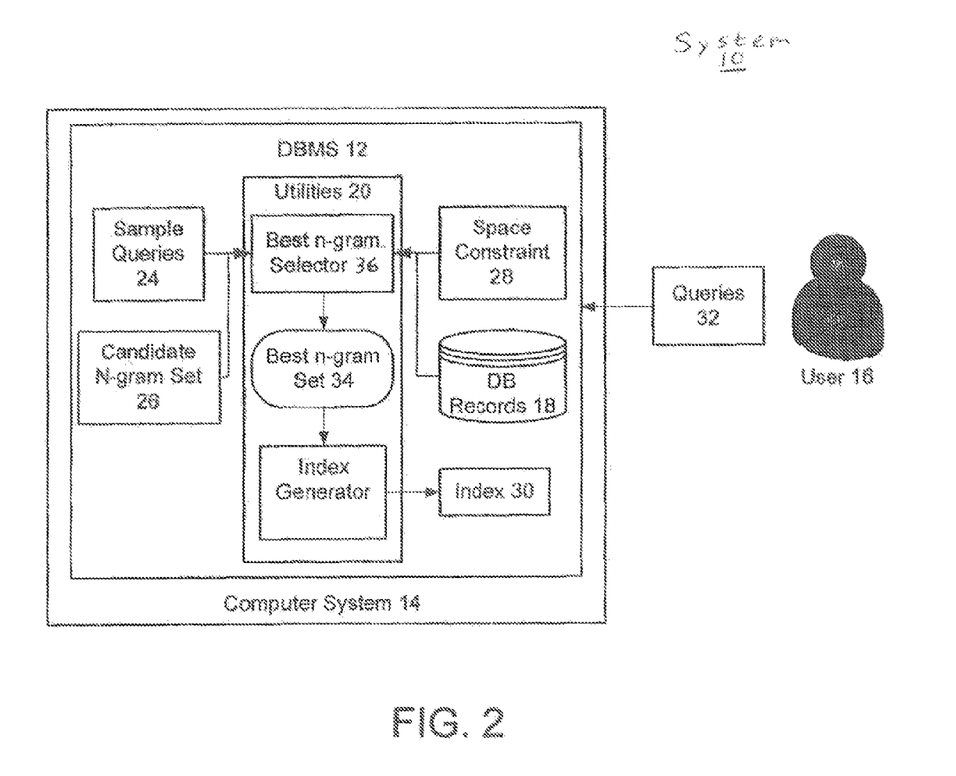
FIG. 2 is a block diagram illustrating a relational database system for implementing optimal n-gram indexing in accordance with the present invention in a preferred embodiment of the present invention.

FIG. 2 is a block diagram illustrating a relational database system for implementing optimal n-gram indexing in accordance with the present invention in a preferred embodiment of the present invention. The system 10 includes a relational DBMS 12 capable of being executed on a computer system 14 to provide user 16 access to database (DB) records 18. The DBMS 12 includes a set of administrative facilities or utilities 20 for controlling and managing operation of the DBMS 12. According to the present invention, the utilities 36 include a best n-gram selector 20 and an index generator 22, explained below.

As is well-known in the art, the computer system 14 includes hardware (not shown) such as processor and associated main memory to support the execution of the DBMS 12 as well as storage devices, typically hard disk drives, for storing the database records 18, together with associated input/output devices, such as device controllers. The database records 18 may be located in a central location and/or located remotely via a network, such as the Internet, for example. The DBMS 12 is based on the relational model in which the data is organized as a collection of tables, each having one or more database records 18.

Figure 3:
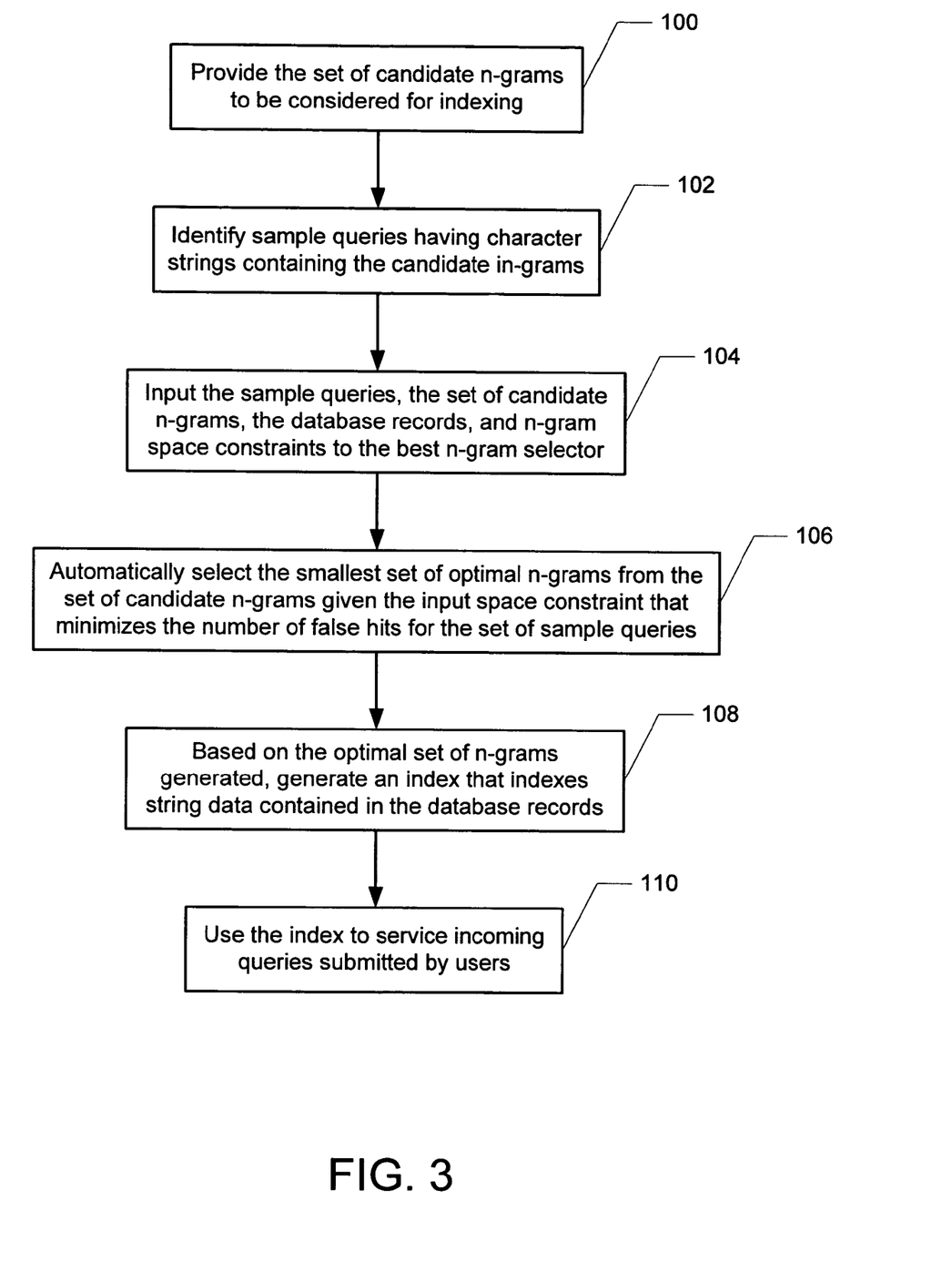
FIG. 3 is a flow diagram illustrating the process for best n-gram selection in a DBMS system in accordance with a preferred embodiment of the present invention.

FIG. 3 is a flow diagram illustrating the process for best n-gram selection in a DBMS system in accordance with a preferred embodiment of the present invention. Referring to both FIGS. 2 and 3, the process begins in step 100 by providing a set of candidate n-gram set 26 to be considered for indexing. The candidate n-gram set 26 is well-known and commercially available, e.g., the published English literature n-grams. Each n-gram in the set of candidate n-gram set 26 is typically in the form of a substring. The candidate n-gram set 26 can be a large set, since it will eventually be pruned.

It is possible for the candidate n-gram set 26 to become impracticably large if care is not taken. For example, even if one of twenty-six characters could appear in each string position, there are twenty-six possible 1-grams, 676 possible 2-grams, 17,576 possible 3-grams, 456,976 possible 4-grams, and 11,881,376 possible 5-grams, a set too large to handle in a practical manner. The first step, therefore, is to identify the candidate n-gram set 26 from which to select final n-grams. In prior work, n-grams have been identified by popularity, exhaustively, and randomly. In the exhaustive technique, all grams up to a certain length, say all 1-grams, 2-grams, and 3-grams, would be considered candidates.

In step 102, sample queries 24 having character strings containing the candidate n-gram set 26 are identified. The sample queries 24 are a representative set of queries 32 that were previously submitted to the DBMS 12.

In step 104, the sample queries 24, the candidate n-gram set 26, the database records 18, and n-gram space constraint 28 are used as inputs to the best n-gram selector 36.

In step 106, the best n-gram selector 20 automatically selects the set of optimal or best n-gram set 34 from the candidate n-gram set 26, given the input space constraint 28, that minimizes the number of false hits for the sample queries 24 had the sample queries 24 been executed against the database records 18. Step 106 is explained in further detail below.

In step 108, based on the optimal set of n-grams generated by the best n-gram selector 36, the index generator 22 generates an index 30 that indexes string data contained in the database records 18. As is well-known in the art, an index is a stored file in which each entry (i.e., record) includes two values, a data value and a pointer, where the data value is a value for some field of the index file, and the pointer identifies a record of a file that has the value for the field. In step 110, the DBMS 12 uses the index 30 to service incoming queries 32 submitted by users 16 to speed data access.

Steps 104-110 are preferably performed off-line by the best n-gram selector 36 during DBMS reorganization time (e.g., RUNSTATS) in which sample queries are analyzed and the best n-grams are selected. A database administrator or the like may enter the space constraint 28 as resource availability to the DBMS 12 changes as resources are added, deleted and/or reallocated from the computer system 14. The result is an updated index 30 that increases performance of the DBMS. A variety of indexing methods may be employed by the DBMS system 12, such as binary tree based indexing and bit vector based indexing, based on the requirements of the DBMS system 12.

Figure 4:
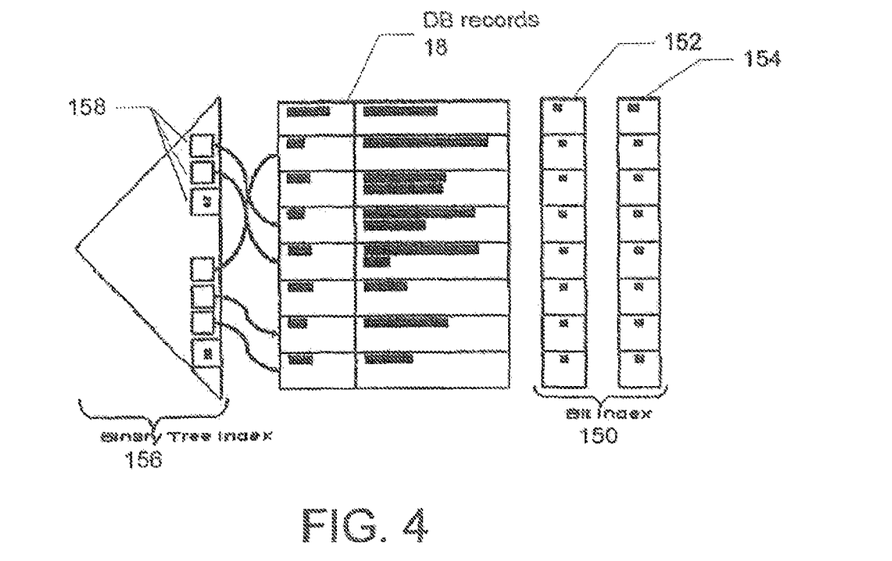
FIG. 4 is a graphical illustration of a bit vector index and a binary tree index for the example database table shown in FIG. 1.

FIG. 4 is a graphical illustration of a bit vector index 150 and a binary tree index 156 for the example database table shown in FIG. 1. For this example, assume that two grams "an" and "or" have been chosen for the best n-gram set 34. The bit vector index 150 includes two bit vectors 152 and 154, one for each gram. If the ith database record of the DB records 18 includes the specified gram then the ith bit of the vector is set to 1, 0 otherwise. Also shown is the binary tree index 156.

The leaf nodes 158 of the binary tree index 156 contain grams "an" and "or" along with pointers to all DB records 18 containing that gram. Generally, the binary tree index 156 is efficient when a small number of records have to be fetched. However, if a large number of rows have to be processed and the number of grams is small, the bit vector method is more efficient.

As stated above, the primary purpose of the best n-gram selector 36 is to choose the most useful/optimal/best set of grams from the set of candidate n-grams 26, where usefulness is determined as minimization of false positives returned by the index 30. We recognize that the problem of optimal n-gram selection, picking a set of exactly k n-grams from the candidate set 26 so as to maximize "efficiency" or reduce "inefficiency," is NP-hard, i.e., cannot be solved in polynomial time. This theorem can be proved by a reduction from the Maximum-K-Coverage problem, which outside the scope of this disclosure.

Having said that the k-Gram-Select problem is NP-hard, the present invention provides the best n-gram selector 36 with an approximation algorithm for solving the maximum-k-coverage problem in a manner that provides a near optimal solution. One aspect of the approximation is to model the n-gram selection problem as a graph, as depicted in FIG. 5.

Figure 5:
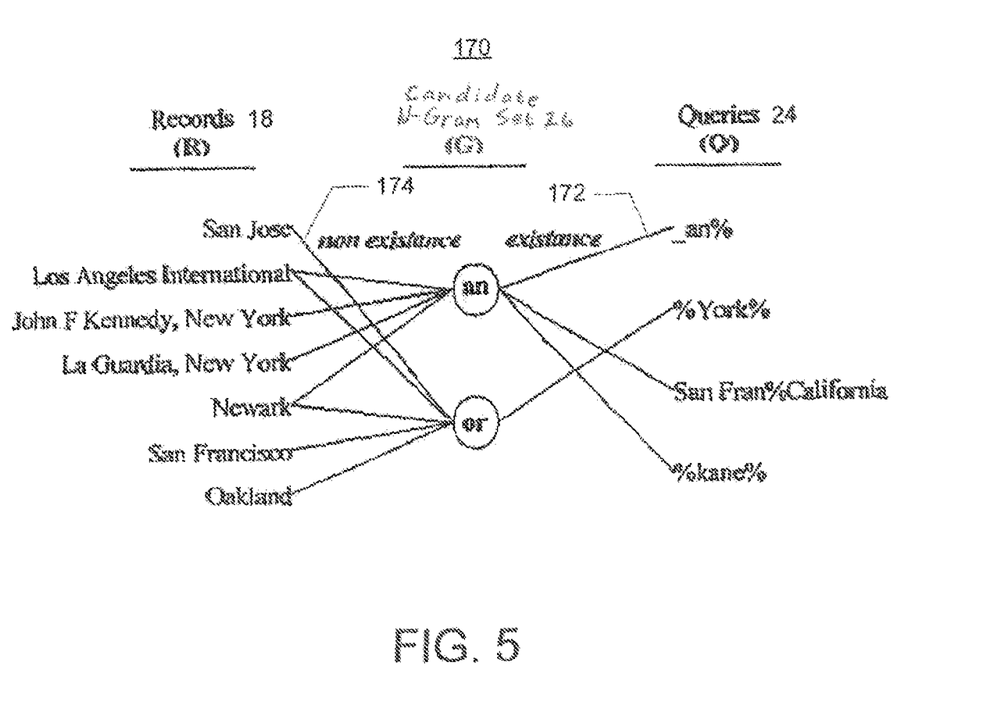
FIG. 5 is a diagram illustrating an example of modeling the n-gram selection problem as a graph.

FIG. 5 is an example graph corresponding to the example shown in FIG. 1. According to the present invention, the best n-gram selector 36 utilizes three main entities; candidate n-grams 26, sample queries 24, and database records 18 to solve the n-gram selection problem. The graph 170 has three types of nodes or vertices corresponding to these sample queries 24, candidate n-grams 26, and database records 18, Q, G, and R, respectively.

An edge 172 is drawn between a sample query 24 q∈Q and a gram 26 g∈G if the gram g is included in the query q. In contrast, an edge 174 is drawn between a gram 26 g∈G and a database record 18 r∈R, if g is not included in the database record r. This means that a connection between a gram 26 and a database record 18 is made if the record can be filtered by using the gram. It should be clear that there are no direct edges between query nodes and record nodes, but they are connected via gram nodes.

Figure 6:
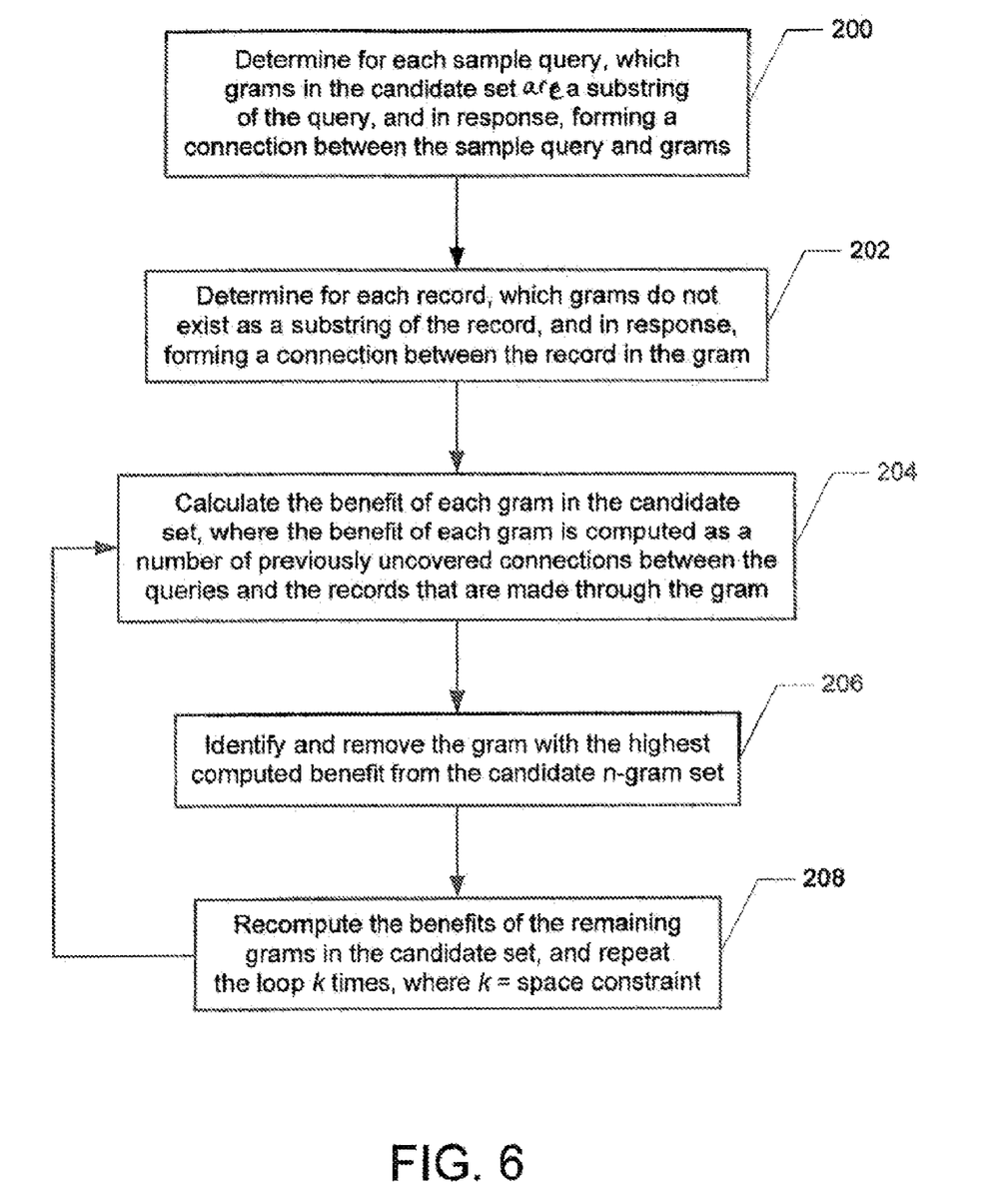
FIG. 6 is a flow diagram illustrating the approximation algorithm, which is used to solve the n-gram selection problem in accordance with a preferred embodiment of the present invention.

FIG. 6 is a flow diagram illustrating the approximation algorithm, which is used to solve the n-gram selection problem using the above principles in accordance with a preferred embodiment of the present invention. The approximation algorithm of the present invention is preferably embodied in the best n-gram selector 36. In one preferred embodiment, the approximation algorithm may be used for increasing the performance of "LIKE" queries in SQL, where strings that are included in "LIKE" queries submitted to the DBMS 12 are sampled and collected.

Given the candidate n-grams 26, sample queries 24, database records 18, and an input space constraint 28, the process begins in step 200 by determining for each sample query 24, which grams in the candidate set 26 are a substring of the query 24, and in response, forming a connection between the sample query 24 and the gram.

In step 202, it is determined for each record 18, which grams do not exist as a substring of the record 18, and in response, forming a connection between the record 18 and the gram. In step 204, the benefit of each gram in the candidate set 26 is calculated, where the benefit of each gram is computed as a number of previously uncovered connections between the queries 24 and the records 18 that are made through the gram. A connection made through a gram between a query 24 and a record 18 is herein referred to as a query-record pair.

Figure 7:
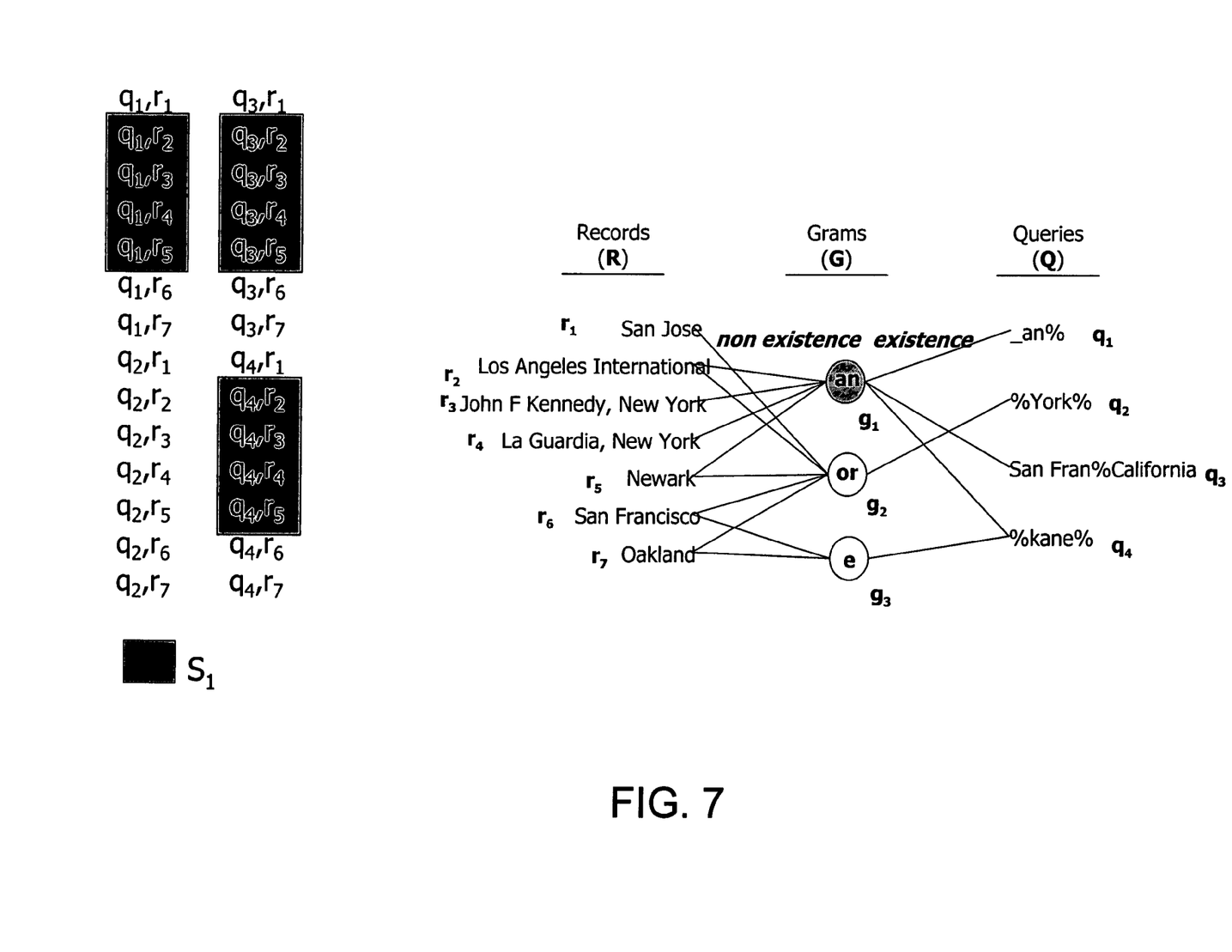
FIGS. 7-10 are diagrams graphically illustrating with reference to the examples shown in FIGS. 1 and 5.
Figure 8:
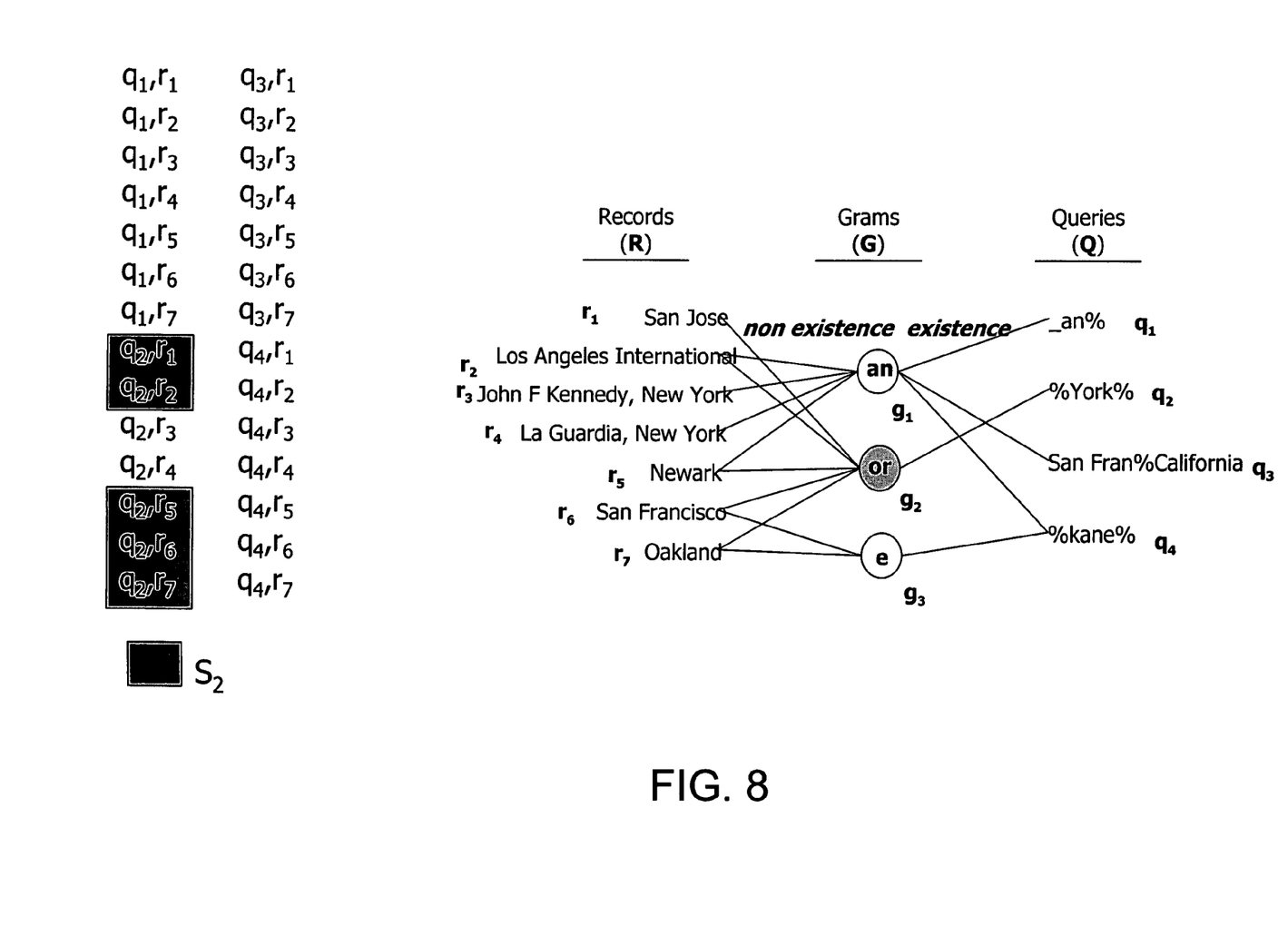
Figure 9:
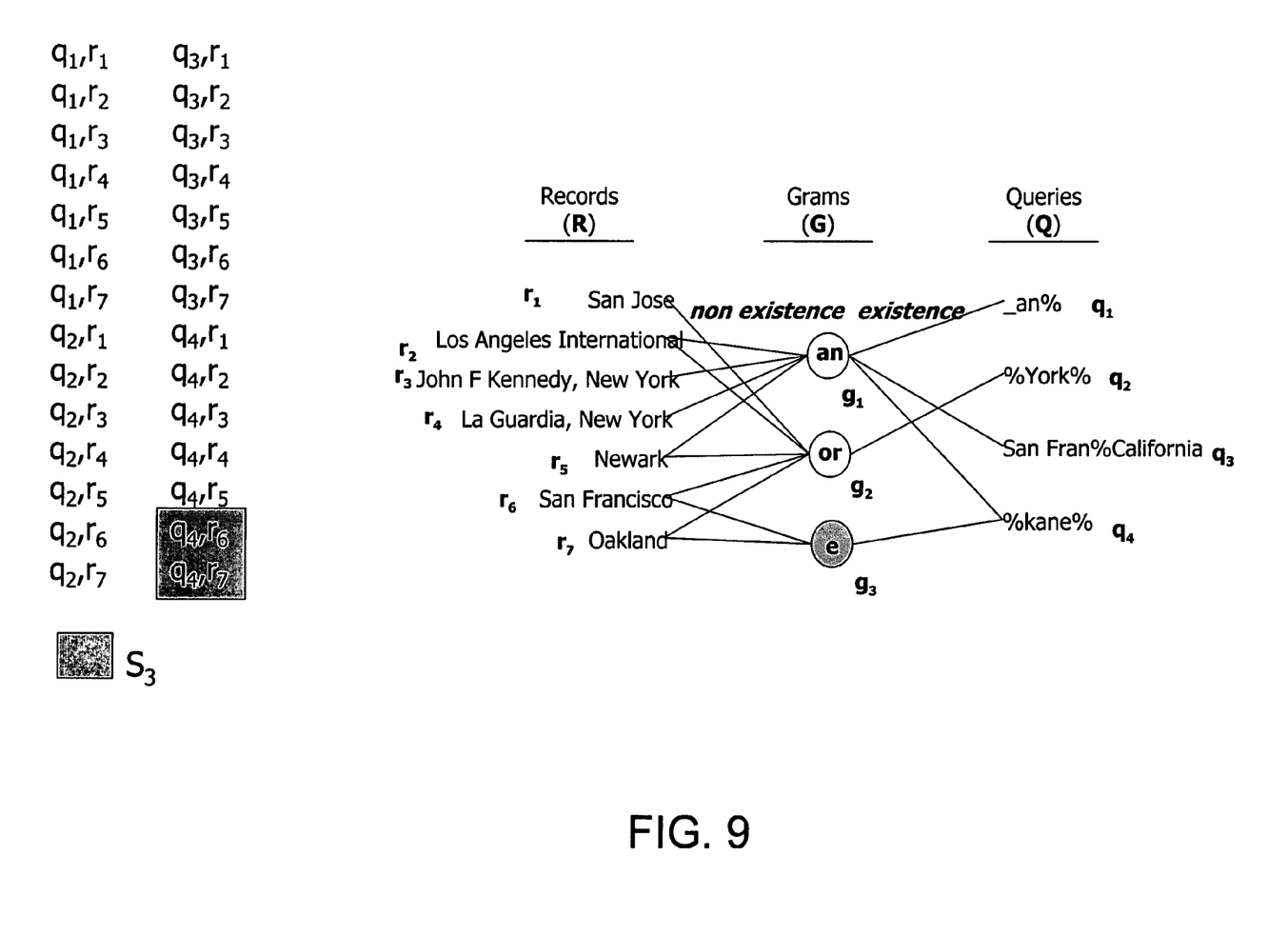

FIGS. 7-10 are diagrams graphically illustrating step 204 with reference to the examples shown in FIGS. 1 and 5. FIG. 7 graphically shows the number of query-record pairs connected through gram $g_1$ of the candidate set 26, represented by set S1. The query-record pairs in S1 are {(q1,r2), (q1,r3), (q1,r4), (q1,r5), (q3,r2), (q3,r3), (q3,r4), (q3,r5), (q4,r2), (q4, r3), (q4,r4), (q4,r5)}. FIG. 8 graphically shows the number of query-record pairs connected through gram $g_2$ of the candidate set 26, represented by set S2. The query-record pairs in S2={(q2,r1), (q2,r2), (q2,r5), (q2,r6), (q2,r7)}. FIG. 9 graphically shows the number of query-record pairs connected through gram $g_3$ of the candidate set 26, represented by set S3. The query-record pairs in S3 are S3={(q4,r6), (q4,r7)}. And FIG. 10 graphically shows the total number of query-record pairs possible using all three candidate grams.

Referring again to FIG. 6, in step 206, the gram with the highest computed benefit is identified and removed from the candidate gram set 26. In step 208, the benefits of the remaining grams in the candidate set 26 are recomputed by performing steps 204-208 k times, where k is the given space constraint. Computing steps 204 and 208 k times will result in a best n-gram set 34 of exactly k n-grams that maximize reachability among unique record-query pairs, maximizes rejections, and therefore minimizes false hits. Stated another way, given k, the approximation algorithm finds a best n-gram set 34 that is a subset of the candidate n-grams 26 having a size k, such that the number of record-query pairs connected through the best n-grams is maximum over all possible sets of best n-gram sets.

Figure 10:
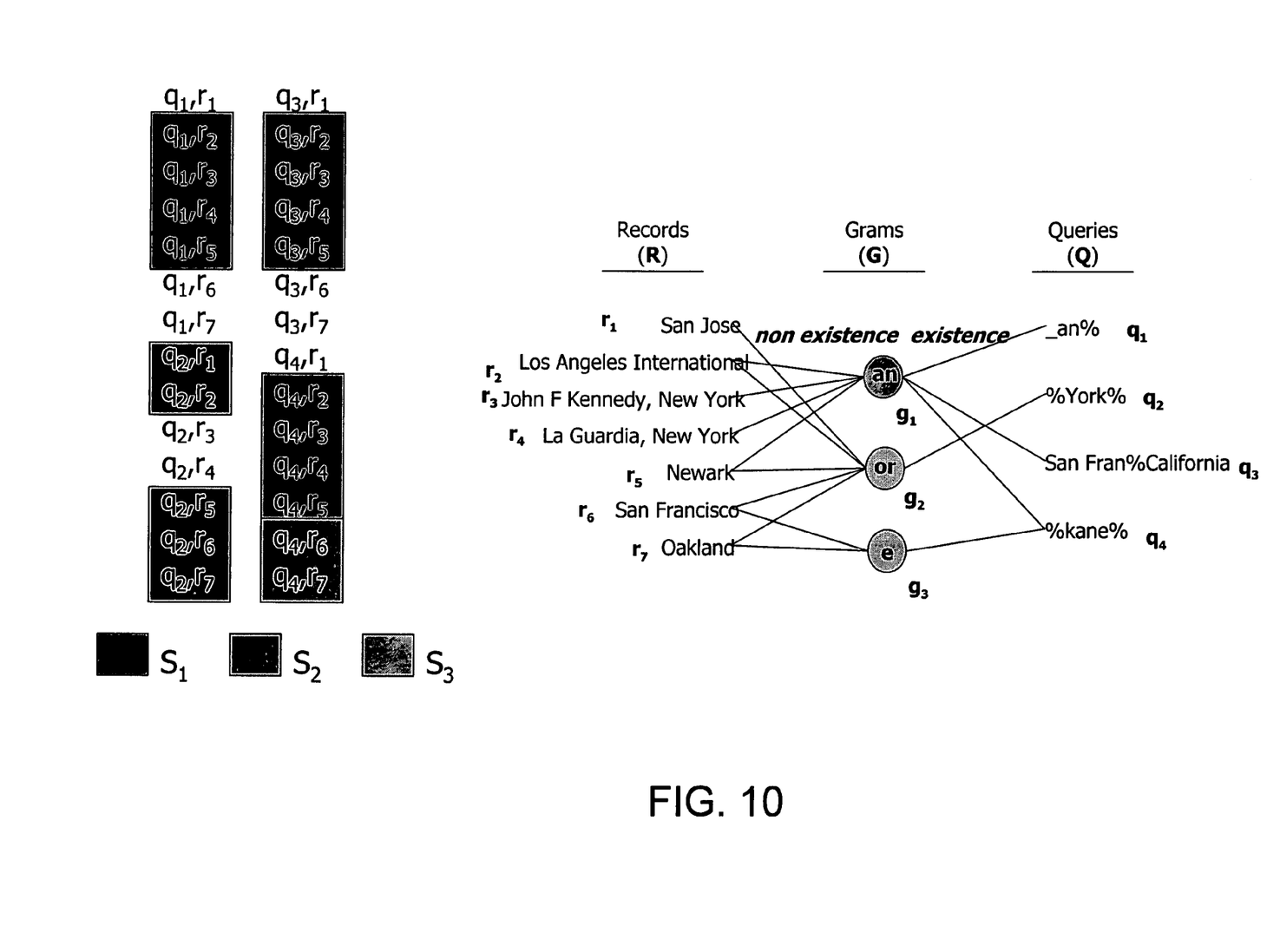

Referring to the examples shown in FIGS. 7-10, if the space constraint specified that only two of the three grams in the candidate set 26 could be included in the best n-gram set 34, i.e., k=2, then the goal of the approximation algorithm is to find which combination of "two" sets of (S1, S2, S3) cover the most query-record pairs. In this example, sets S1 and S2 corresponding to grams "an" and "or" cover the most query-record pairs, as shown in FIG. 10. Therefore, the approximation algorithm would output a best n-gram set 34 comprising the two grams "an" and "or".

Not only does the approximation algorithm of the present invention provide a near optimal solution to the NP hard n-gram selection problem, but also does so within a definable ratio or error bound of the optimal solution, which is:

$$\frac{|C'|}{|C^*|} > 1 - \frac{1}{e}$$

where $|C^*|$ is the number of points covered by an optimum solution $C^*$ and $|C'|$ is the number of points covered by the near optimal solution produced by the approximation algorithm.

Figure 11:
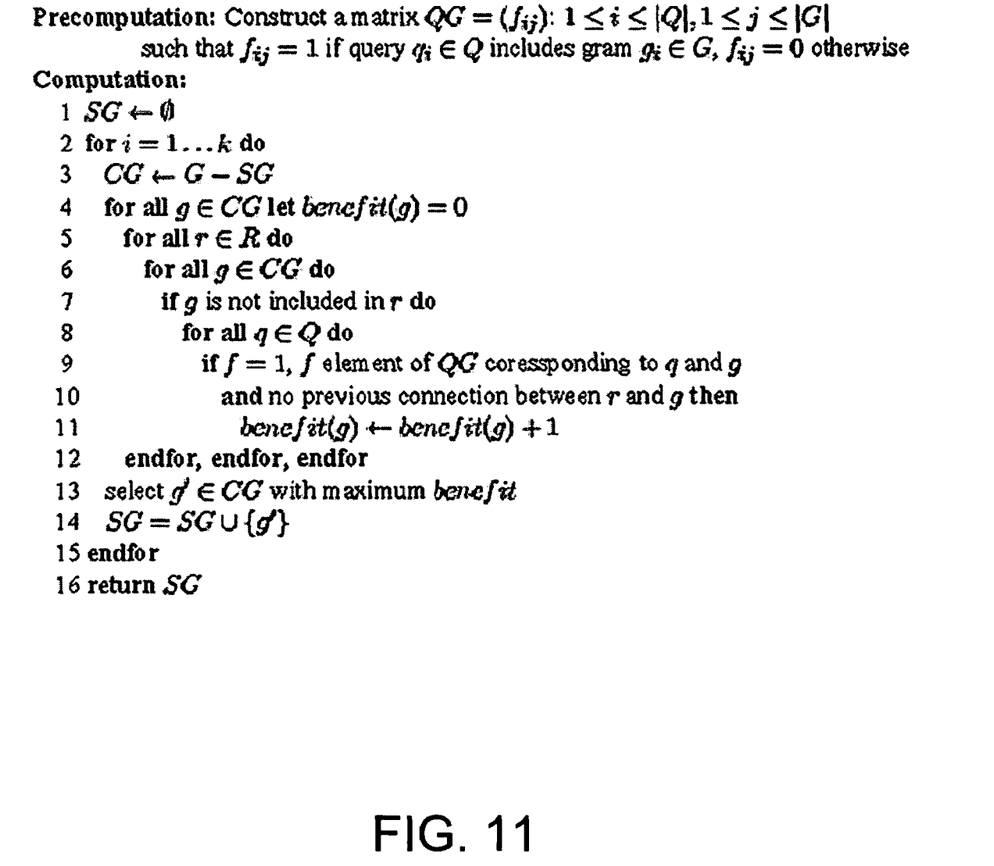
FIG. 11 is a diagram illustrating pseudo code for the approximation algorithm.

FIG. 11 is a diagram illustrating pseudo code for the approximation algorithm. Inputs to the algorithm are the set of candidate grams G; a set of sample queries Q; a set of database records R; and the number of grams to be selected k. Output of the algorithm is a set of the selected grams SG with optimum benefit, of size k. The set of selected grams SG corresponds to the best n-gram set 34.

Prior to executing the algorithm, a pre-computation step is shown that constructs a matrix QG in order to implement the graph shown in FIG. 5. The pre-computation step corresponds to steps 200 and 202 of FIG. 6.

The computation of the algorithm begins with an empty selected set of grams SG in line 1. The major loop in line 2 is executed only k times in order to eventually produce k selected grams for SG. Lines 4-12, which correspond to step 204 of FIG. 6, compute the benefits of the grams of remaining subsets of grams in the candidate set G each iteration of g, the loop on line 4. In line 13, the gram, g', having the maximum benefit is selected, and added to the selected set, SG in line 14. The algorithm continues at line 2 until executed k times. The result is SG having the best set of n-grams.

To test the efficiency of our optimal n-gram selection strategy, we conducted experiments based on real bibliographic data available from the Digital Bibliography & Library Project. Our schema included two character attributes, Author, that stored author name(s) delimited by comma if there is more than one author, and Publication, that stored the name of the publication. We used the most recent data available at the time of writing, comprised of approximately 305, 000 records.

We compared our strategy with two of others, which are random gram selection and published (English) literature grams as follows:

Randomly selected n-grams: We first created all possible 1-grams and 2-grams and randomly selected k=101 of them (with equal probability of selecting 1 and 2-grams). We picked k=101 to be fair with the list of literature grams, which contains 101 grams.

Literature n-grams: We used a published list of 101 popular n-grams of the English language. This list consists of 1-grams (i.e., letters), 2-grams, and 3-grams. We synthesized queries based on author names by randomly selecting last names from the data. For example, if the author "brown" is selected randomly, then the query is: SELECT*FROM dblp WHERE author LIKE '% brown %'.

Since, in optimization, our goal is to minimize the number false positives in the returned answers from the index, we plotted the number of false positives as a percentage of the number of positives. Randomly selected grams gave the worst performance in the metric by generating 98% false positives. This number drops to 87% for literature grams. Optimal n-gram selection strategy was superior to first two by exhibiting 47%. These results validate the efficiency of our optimal n-gram selection method.

We further experimented the efficiency of optimally selected grams with different (increasing) number of selected grams. As it is presented, optimally selected grams' performance significantly improves with the increasing number. The percentage of false positives in returned results was dropped from 99% for 8 selected grams to 30% for 256 selected grams.

Increasingly, emerging applications require effective support for indexing and searching over non-traditional data types that have traditionally not been well supported by data management engines. The most important of these is textual data. A typical query over textual data is pattern based—requiring all strings that contain the pattern to be retrieved. A promising approach to support such queries is to use string n-grams to build an index. The present invention solves the problem of optimally selecting n-grams for indexing textual data under space constraints.

According to the method and system disclosed herein, the present invention poses the n-gram selection problem as an optimization problem and formulates the n-gram selection problem as a graph model. The present invention is implemented as an approximation algorithm executed in a DBMS system that provides a near optimal solution for solving the n-gram selection problem, which has proven to be NP-hard. In addition, the approximation algorithm has a provable ratio bound of the optimal solution.

A method and system for optimal selection of n-grams in a DBMS system under given set of space constraints introduced by system has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for selecting a set of n-grams for indexing string data in a database management system (DBMS) in relation to resources available to the DBMS, comprising:
    providing a set of candidate n-grams, each n-gram comprising a sequence of characters;
    receiving an n-gram space constraint to define an amount "k" of the set of candidate n-grams eligible for a minimal set of n-grams, the n-gram space constraint based on resources available to the DBMS;
    comparing each of the candidate n-grams from the provided set of candidate n-grams with sample queries and database records to determine a benefit associated with the candidate n-grams in reducing false hits;
    selecting the minimal set of n-grams, the minimal set of n-grams having a highest total benefit and being subject to the n-gram space constraint;
    selecting an updated minimal set of n-grams responsive to receiving an updated n-gram space constraint, the updated minimal set of n-grams having a highest total benefit and being subject to the updated n-gram space constraint, wherein the updated minimal set of n-grams consists of no more than "k" n-grams; and,
    generating an index, based on the minimal set of selected n-grams or the updated minimal set of n-grams, that indexes string data contained in the database records.

2. The method of claim 1, further including:
using the index to service incoming queries.

3. The method of claim 1 wherein the n-gram selection is a problem that is NP-hard, the method further including:
formulating n-gram selection as a graph model, and solving the problem using an approximation algorithm.

4. The method of claim 3 further including:
providing the approximation algorithm with a provable ratio bound of an optimal solution to the n-gram selection problem.

5. The method of claim 3 further including:
implementing the approximation algorithm as a utility of the DBMS.

6. The method of claim 1 wherein the DBMS is a SQL-based DBMS, further including:
identifying SQL "LIKE" queries containing the candidate n-grams.

7. A method for selecting a set of n-grams for indexing string data in a database management system (DBMS), wherein the DBMS includes a set of candidate n-grams, a set of sample queries, a set of database records, and an input space constraint 'k' related to resources allocated to the DBMS, the method comprising:
a) determining for each sample query from the set of sample queries, which n-grams in the candidate set are a substring of the sample query, and in response, forming a connection between the sample query and the n-gram;
b) determining for each database record from the set of database records, which n-grams do not exist as a substring of the database record, and in response forming a connection between the database record and the n-gram;
c) receiving the input space constraint 'k' the input space constraint 'k' directly related to resources allocated to the DBMS;
d) calculating a benefit of each n-gram in the candidate set, wherein the benefit of each n-gram is computed as a number of previously uncovered connections between the queries and the database records that are made through the n-gram, wherein a connection made through an n-gram between a query and a database record comprises a query-record pair;
e) identifying the n-gram with the highest computed benefit, and storing the identified n-gram in a selected n-gram set;
f) recomputing the benefits of remaining n-grams in the candidate set by performing steps d) and (e) 'k' times, thereby resulting in the selected n-gram set having 'k' n-grams, such that the number of query-record pairs connected through best n-grams is a maximum over all possible sets of best n-gram sets;
g) generating an index, based on the selected n-gram set;
h) using the generated index by the DBMS to service incoming queries, whereby the generated index created from the selected n-gram set minimizes false hits because the selected n-gram set maximizes reachability among unique query-record pairs and maximizes rejections.

8. The method of claim 7 further comprising:
implementing an approximation algorithm as a utility of the DBMS.

9. The method of claim 8 wherein the approximation algorithm provides a near optimal solution to an NP-hard n-gram selection problem, the method further comprising:
providing the approximation algorithm with a definable ratio bound of the optimal solution.

10. The method of claim 9 wherein the definable ratio bound is:

$$\frac{|C'|}{|C^*|} > 1 - \frac{1}{e}$$

where I C*I is a number of points covered by an optimum solution C* and I C' I is a number of points covered by the near optimal solution produced by the approximation algorithm.

11. The method of claim 8 wherein the DBMS is a relational database system.

* * * * *